US008359350B2

(12) United States Patent
Urakawa

(10) Patent No.: US 8,359,350 B2
(45) Date of Patent: Jan. 22, 2013

(54) COMMUNICATION APPARATUS FOR DISPLAYING CONTENT AND STORAGE MEDIUM STORING PROGRAM

(75) Inventor: Yutaka Urakawa, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 327 days.

(21) Appl. No.: 12/718,816

(22) Filed: Mar. 5, 2010

(65) Prior Publication Data

US 2010/0250657 A1 Sep. 30, 2010

(30) Foreign Application Priority Data

Mar. 26, 2009 (JP) ................................. 2009-075707

(51) Int. Cl.
*G06F 15/16* (2006.01)
(52) U.S. Cl. ............ 709/203; 725/38; 725/44; 715/740; 715/766; 715/794
(58) Field of Classification Search .................. 709/203
See application file for complete search history.

(56) References Cited

U.S. PATENT DOCUMENTS

| | | | | |
|---|---|---|---|---|
| 6,480,208 | B1* | 11/2002 | Eble et al. ...................... | 715/807 |
| 2004/0070627 | A1* | 4/2004 | Shahine et al. ................ | 345/794 |
| 2006/0213976 | A1* | 9/2006 | Inakoshi et al. ............... | 235/380 |
| 2007/0214477 | A1* | 9/2007 | Read ............................... | 725/38 |
| 2008/0148166 | A1* | 6/2008 | Brunswig et al. ............. | 715/766 |
| 2008/0165209 | A1* | 7/2008 | Kondo et al. .................. | 345/670 |
| 2009/0079587 | A1* | 3/2009 | Satoh ............................. | 340/905 |
| 2009/0313655 | A1* | 12/2009 | Kraft et al. .................... | 725/44 |

FOREIGN PATENT DOCUMENTS

| | | |
|---|---|---|
| JP | H06-008987 U | 2/1994 |
| JP | 2000-298461 A | 10/2000 |
| JP | 2001-022668 A | 1/2001 |
| JP | 2001022668 A * | 1/2001 |
| JP | 2007-299276 A | 11/2007 |
| JP | 2008-165692 A | 7/2008 |
| JP | 2008-186305 A | 8/2008 |

OTHER PUBLICATIONS

Odu, Tomoyuki, "'Dirty News Reader' For Displaying A Delivery Article Title Of A RSS-Capable Site In The Manner Of An Electric Bulletin Board," Impress Corporation, May 26, 2004, available at http://www.forest.impress.co.jp/article/2004/05/26/dirtynewsreader.html (searched on Jul. 29, 2008). (Concise explanation/partial translation also enclosed). Japan Patent Office, Notification of Reason for Refusal for Japanese Patent Application No. 2009-075707 (counterpart to above-captioned patent application), dispatched Mar. 1, 2011.

* cited by examiner

*Primary Examiner* — Firmin Backer
*Assistant Examiner* — Natisha Cox
(74) *Attorney, Agent, or Firm* — Baker Botts L.L.P.

(57) ABSTRACT

A communication apparatus including: a content-information extracting section which obtains feed information and extracts content information from the feed information; a display-priority setting section which sets a display priority; a display-priority changing section which lowers, on the basis of display of at least part of the content information, the display priority of the displayed content information by a first degree; a display-number setting section which sets the display number of times such that the display number of times of the content information during displaying of the at least part of each of all content informations to be displayed among the content informations is larger in a situation where the content information has a high display priority than in a situation in where the content information has a low display priority; and a display controller which displays the at least part on the basis of the display number of times.

10 Claims, 12 Drawing Sheets

FIG.8

| IDENTIFICATION NUMBER | SITE URL | OBTAINING SETTING | OBTAINING STATUS |
|---|---|---|---|
| 0 | http://www.example0.com | OBTAIN | UPDATED |
| 1 | http://www.example1.com | NOT OBTAIN | UNUPDATED |
| 2 | http://www.example2.com | OBTAIN | UNUPDATED |
| ⋮ | ⋮ | ⋮ | ⋮ |
| n-1 | http://www.examplen-1.com | NOT OBTAIN | UNUPDATED |

FIG.9

| IDENTIFICATION NUMBER | TITLE CHARACTER STRING | DESCRIPTION | CONTENT-UPDATED DATE-AND-TIME INFORMATION | CONTENT URL | DISPLAY PRIORITY | ATTRIBUTE INFORMATION |
|---|---|---|---|---|---|---|
| 0 | ... | ... | ... | ... | ... | ... |
| ⋮ | ⋮ | ⋮ | ⋮ | ⋮ | ⋮ | ⋮ |
| (m-1) | ... | ... | ... | ... | ... | ... |

FIG.10

| MEMORY NUMBER | TITLE CHARACTER STRING | DESCRIPTION |
|---|---|---|
| M0 | ... | ... |
| ⋮ | ⋮ | ⋮ |
| M(k-1) | ... | ... |

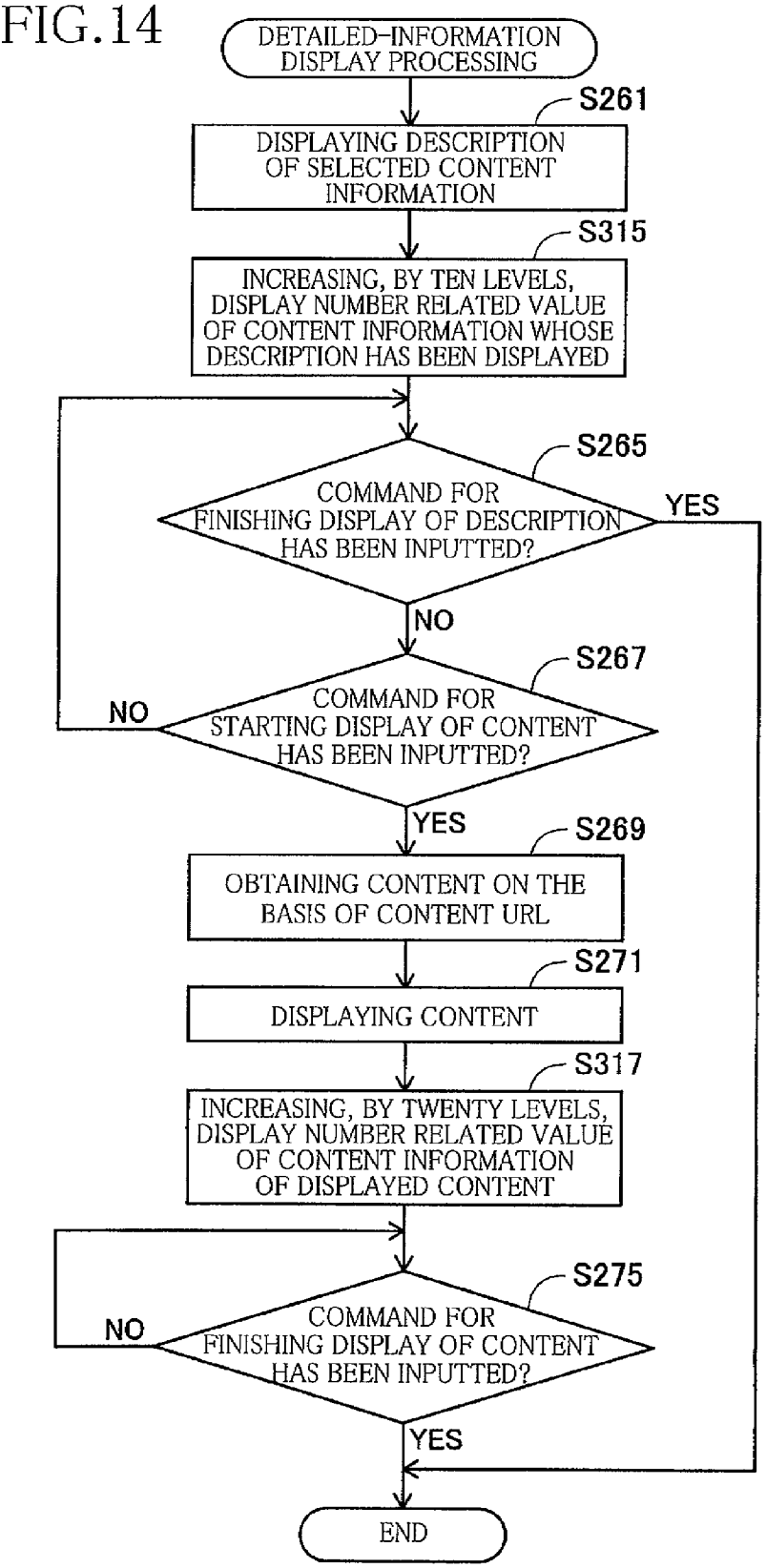

COMMUNICATION APPARATUS FOR DISPLAYING CONTENT AND STORAGE MEDIUM STORING PROGRAM

CROSS REFERENCE TO RELATED APPLICATION

The present application claims priority from Japanese Patent Application No. 2009-075707, which was filed on Mar. 26, 2009, the disclosure of which is herein incorporated by reference in its entirety.

BACKGROUND OF THE INVENTION

1. Field of the Invention

The present invention relates to a communication apparatus and a storage medium storing a program for displaying information relating to a content published on a network.

2. Description of the Related Art

Various contents are published on a network. There are servers on each of which is published information (e.g., feed information) including a plurality of content informations each including a URL and a title thereof. A format of the feed information includes RSS (Resource Description Framework Site Summary) and Atom, for example. In the conventional technique, there is a software for obtaining the feed information and extracting the content informations from the obtained feed information to display the title of each of the content informations. Where this software is installed on a PC, a user can browse or view each content title. When the user has clicked the title, the PC starts up a browser and accesses a URL of the content which corresponds to the clicked title. As a result, the content is displayed on the PC.

SUMMARY OF THE INVENTION

Among the content informations extracted from the feed information are content information(s) whose updated date and time is relatively new and content information(s) whose updated date and time is relatively old. Where all the extracted content informations are displayed, new information(s) may be buried in old information(s), thereby causing the case where the user does not notice the new information(s). In particular, where a large number of the content informations have been extracted, a possibility in which the user does not notice the new information(s) becomes higher.

This invention has been developed in view of the above-described situations, and it is an object of the present invention to provide a communication apparatus and a storage medium storing a program for solving or eliminating the above-described inconvenience.

The object indicated above may be achieved according to the present invention which provides a communication apparatus comprising: a content-information extracting section configured to obtain feed information including a plurality of content informations each of which at least includes a title of a content, positional information of the content, and text information representing an outline of the content, and configured to extract the content information from the obtained feed information; a display-priority setting section configured to set, for each content information, a display priority which is for display on a display portion; a display-priority changing section configured to lower, on the basis of display of at least part of the content information on the display portion, the display priority of the displayed content information by a first degree; a display-number setting section configured to set the display number of times such that the display number of times of the content information displayed on the display portion during displaying of the at least part of each of all content informations on the display portion which are to be displayed on the display portion among the plurality of content informations is larger in a situation in which the content information has a high display priority than in a situation in which the content information has a low display priority; and a display controller configured to display the at least part of the content information on the display portion on the basis of the display number of times of the content information which has been set by the display-number setting section.

The object indicated above may be achieved according to the present invention which also provides A communication apparatus comprising:
a content-information extracting section configured to obtain feed information including a plurality of content informations each of which at least includes a title of a content, positional information of the content, and text information representing an outline of the content, and configured to extract the content information from the obtained feed information; a display number related value setting section configured to set a display number related value which is a value related to the display number of times of at least part of the content information on the display portion and which is larger in a situation in which the display number of times of the at least part of the content information is large than in a situation in which the display number of times of the at least part of the content information is small; a display number related value changing section configured to increase by a first degree, on the basis of the display of the at least part of the content information on the display portion, the display number related value of the displayed content information; a display-number setting section configured to set the display number of times such that the display number of times of content information displayed on the display portion during displaying of the at least part of each of all content informations on the display portion which are to be displayed on the display portion among the plurality of content informations is larger in a situation in which the content information has a small display number related value than in a situation in which the content information has a large display number related value; and a display controller configured to display the at least part of the content information on the display portion on the basis of the display number of times of the content information which has been set by the display-number setting section.

The object indicated above may be achieved according to the present invention which also provides a storage medium storing a program for displaying, on a display portion, at least part of content information at least including a title of a content, positional information of the content, and text information representing an outline of the content, the program comprising: obtaining feed information including a plurality of the content informations extracting the content information from the obtained feed information; setting, for each extracted content information, a display priority which is for display on the display portion; lowering, on the basis of display of the at least part of the content information on the display portion, the display priority of the displayed content information by a first degree; setting the display number of times such that the display number of times of the content information displayed on the display portion during displaying of the at least part of each of all content informations on the display portion which are to be displayed on the display portion among the plurality of content informations is larger in a situation in which the content information has a high display priority than in a situation in which the content information has a low display priority; and displaying the at least part of the content information on the display portion on the basis of the display number of times of the set content information.

It is noted that the term "positional information" is a concept including every information which can specify the position of the content. For example, a URL (Uniform Resource Locator) may be used as the positional information. Further, the term "title" means a character string which is less than a character string of an entire content and which reflects an outline of the content. Further, the term "text information" means summarized information of the content for explaining the outline of the content. An amount of information of the text information is smaller than that of a content based on which the text information is made.

BRIEF DESCRIPTION OF THE DRAWINGS

The objects, features, advantages, and technical and industrial significance of the present invention will be better understood by reading the following detailed description of embodiments of the invention, when considered in connection with the accompanying drawings, in which:

FIG. 8 is a view showing an example of a storing content of a URL storage area;

FIG. 9 is a view showing an example of a storing content of a content storage area;

FIG. 10 is a view showing an example of a storing content of a display content table;

FIG. 14 is a flow-chart showing a detailed-information display processing of the MFD as the second embodiment.

DESCRIPTION OF THE EMBODIMENTS

Figure 1:
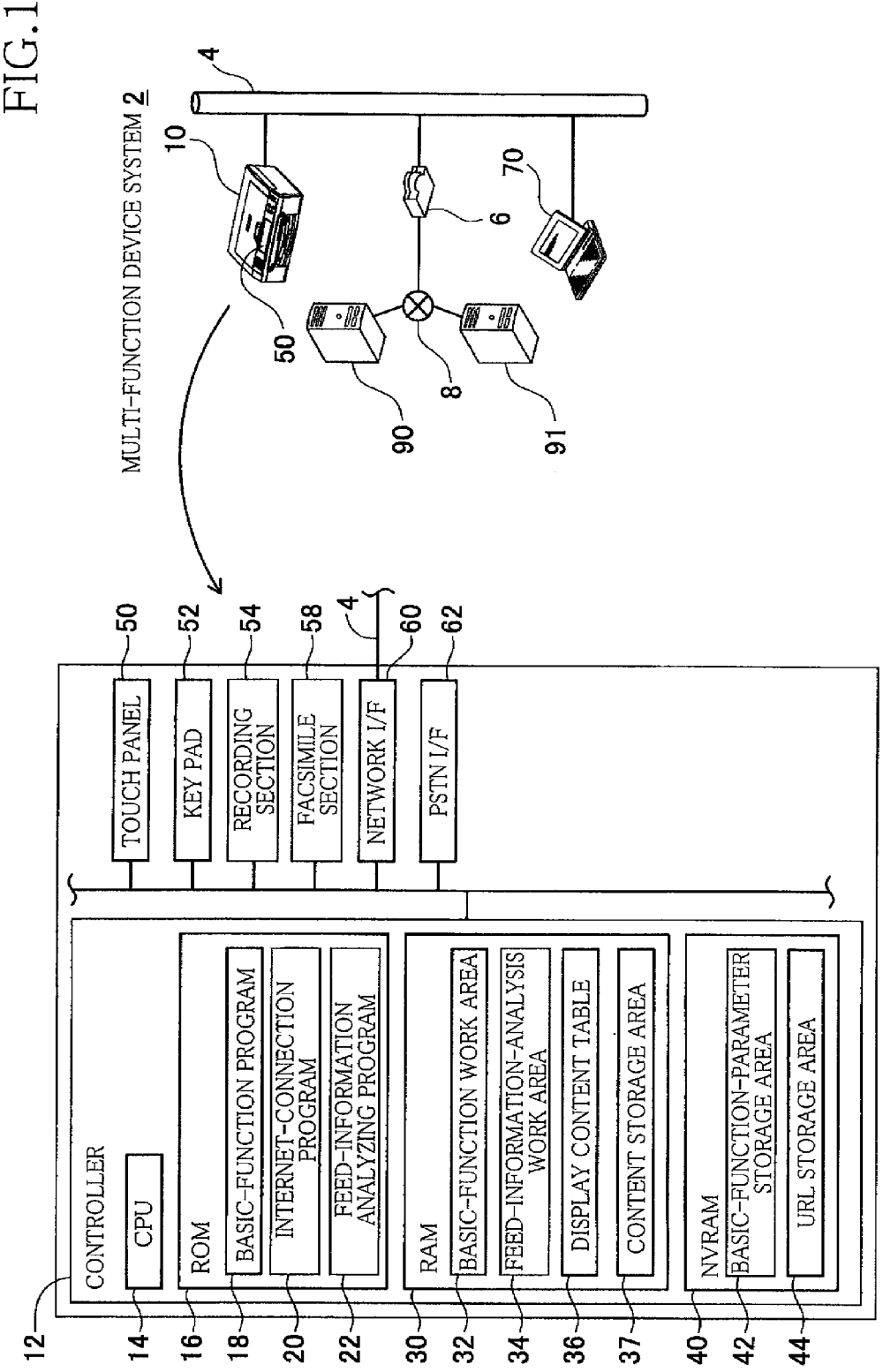
FIG. 1 is a schematic view of a multi-function device (MFD) system.
Figure 2:
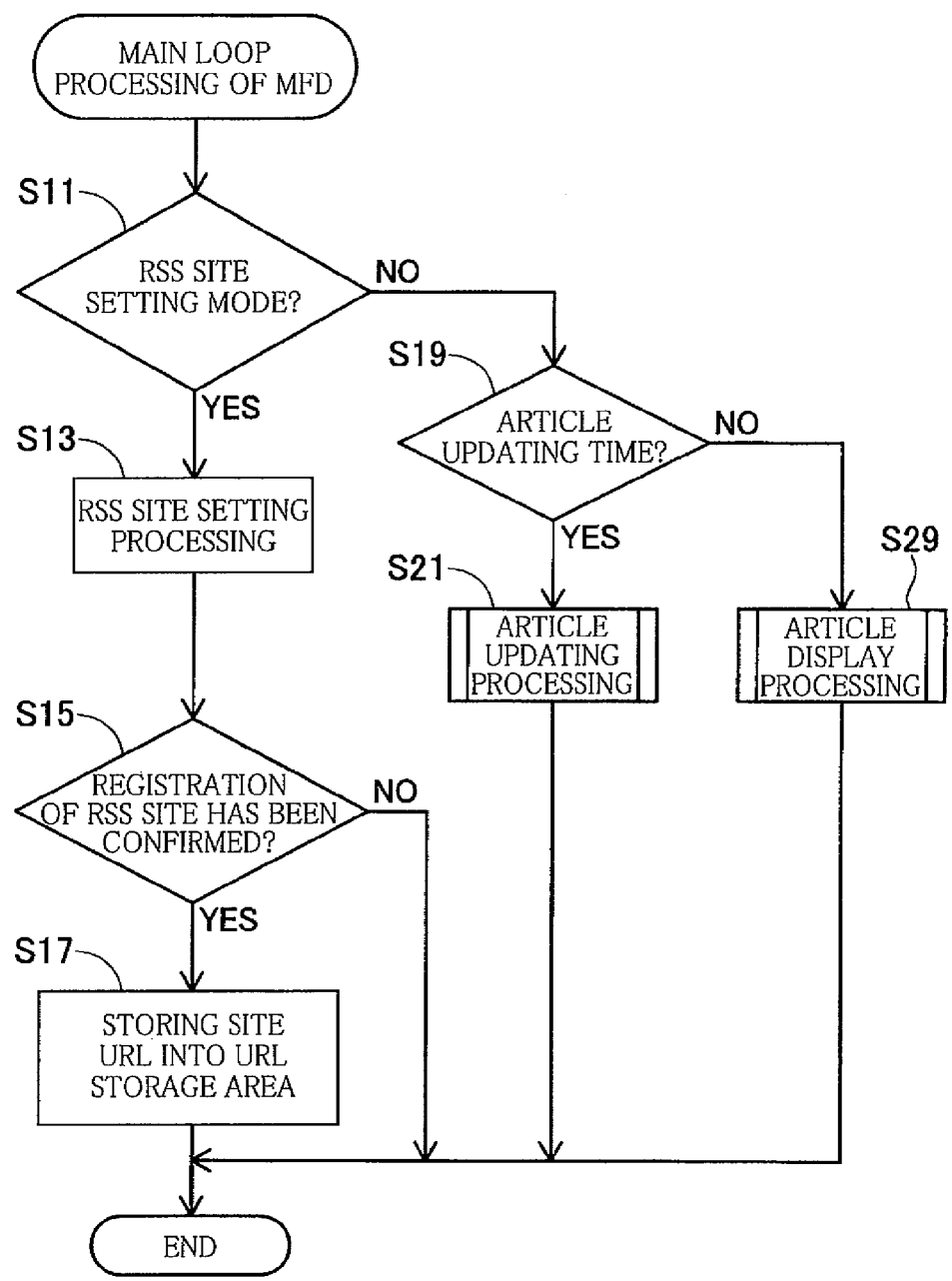
FIG. 2 is a flow-chart showing a main loop processing of the MFD.

Hereinafter, there will be described embodiments of the present invention by reference to the drawings. A multi-function device (MFD) system 2 includes a multi-function device (MFD) 10, a PC 70, and a plurality of content distribution servers 90, 91. The MFD 10 is connected to a LAN line 4. Likewise, the PC 70 is connected to the LAN line 4. The LAN line 4 is connected to an internet 8 via a router 6. Each of the content distribution servers 90, 91 is connected to the internet 8. In the present embodiment, the content distribution server 90 publishes one site while the content distribution server 91 publishes another site. Each site includes a plurality of contents. Each of the content distribution servers 90, 91 stores feed information (feed information in RSS format) which is summarized information of the plurality of contents of the corresponding site. These informations will be explained in detail below.

The MFD 10 includes a controller 12, a touch panel (i.e., a display portion) 50, key pads 52, a recording section 54, a facsimile section 58, a network interface 60, a PSTN interface 62, and so on. The controller 12 includes a CPU 14, a ROM 16, a RAM 30, an NVRAM 40, and so on.

The network interface 60 is connected to the LAN line 4. The MFD 10 can communicate with the PC 70 and access the internet 8.

The CPU 14 performs or executes various processings in accordance with various programs stored in the ROM 16. A basic-function program 18 is a program for controlling basic operations of the MFD 10. The basic-function program 18 includes, e.g., programs for producing display data based on which characters and images are displayed on the touch panel 50. Further, the basic-function program 18 includes, e.g., programs for controlling the recording section 54, the facsimile section 58, and so on. An Internet-connection program 20 is a program for making a connection with the internet 8. A feed-information analyzing program 22 is a program for analyzing the feed information obtained from the content distribution servers 90, 91 and extracting content information 132.

The NVRAM 40 includes a basic-function-parameter storage area 42 and a URL storage area 44. The basic-function-parameter storage area 42 is a storage area for storing various parameters (e.g., a recording setting, a facsimile setting, and so on) used when the CPU 14 performs the processing in accordance with the basic-function program 18. The URL storage area 44 is a storage area for storing URLs of the feed information included in each of the content distribution servers 90, 91. For example, a user needs registration for receiving a content distribution service from each of the content distribution servers 90, 91.

The RAM 30 includes a basic-function work area 32, a feed-information-analysis work area 34, a display content table (i.e., a display-content storage portion) 36, and a content storage area (i.e., a content-information storage portion) 37. The basic-function work area 32 is a storage area for storing various data produced in course of performance of the processing in accordance with the basic-function program 18. The feed-information-analysis work area 34 is a storage area for storing various data produced in course of performance of the processing in accordance with the feed-information analyzing program 22. The display content table 36 is a table storing information for display on the touch panel 50. The content storage area 37 stores the content information(s) 132 extracted from the feed information obtained from the content distribution servers 90, 91. The content information 132 is produced so as to include at least part of the feed information.

In an example of a storing content of the URL storing area 44 in FIG. 8, the URL storing area 44 stores n pieces of site URLs 102. The site URL 102 is a URL of the feed information of each of the content distribution servers 90, 91. An identification number 100 is assigned to each site URL 102. Further, the URL storage area 44 stores an obtaining setting 103 and an obtaining status 104 in correspondence with each site URL 102. The obtaining setting 103 is a setting for determining whether the feed information is obtained on the basis of the site URL 102 or not, and is set in advance by the user, for example. The obtaining status 104 is a status representing whether an update of an article based on the site URL 102 has been performed or not in an article updating processing which will be described below.

There will be next explained a storing content of the content storage area 37 with reference to FIG. 9. The content storage area 37 can store display information 112 in each of the site URLs 102 stored in the URL storage area 44. There will be explained a data structure of each display information 112. The display information 112 includes a site-title character string 122. The site-title character string 122 is a character string representing a site name. Further, the display information 112 includes m pieces of the content informations 132 ("m" is an integer equal to or larger than one). Each content information 132 includes an identification number 130, a content-title character string 140, a description (i.e., text information) 144, a content-updated date-and-time information 142, a content URL (i.e., positional information) 146, a display priority 147, and an attribute information 149. The content-title character string 140 is a string of a title of the content. The description 144 is a summary of the character string included in the content. The content-updated date-and-time information 142 is information relating to a date and time at which the content has been updated in the content distribution server (i.e., the latest date and time). The content URL 146 is a URL of each content. The display priority 147 is information for setting a display priority in the case where the number of displays (i.e., the display number of times) of the content-title character string 140 on the touch panel 50 is made larger. In accordance with the content information 132 whose display priority 147 is set to a relatively high value, the display number of times of the content-title character string 140 is increased when compared with other content informations 132. It is noted that, in an example in the present embodiment, there will be explained the case where the priority becomes higher in accordance that a value of the display priority 147 becomes smaller. The attribute information 149 is information representing newness of the content information 132. In the explanation of the present embodiment, there will be explained the case where three types of the attribute informations 149, namely "new", "normal", and "old" are used.

There will be explained a storing content of the display content table 36 of the RAM 30 with reference to FIG. 10. The display content table 36 includes k pieces of storage areas 134 ("k" is an integer equal to or larger than one). Further, memory numbers M0–M(k–1) are respectively assigned to the storage areas 134. Each of the storage areas 134 stores the content-title character string 140 and the description 144 extracted from the content information 132.

There will be explained operations of the MFD 10 with reference to flow-charts shown in FIGS. 2-7. Initially, there will be explained a main loop of the operation of the MFD 10 with reference to FIG. 2. The present main loop processing is repeatedly performed from turning on a main power of the MFP 1 until the main power is turned off. In S11, the CPU 14 judges whether the MFD 10 is in an RSS site setting mode or not. Where the CPU 14 has judged that the MFD 10 is in the RSS site setting mode (S11: YES), the processing goes to S13. A change to the RSS site setting mode is performed by an operation of the user, for example.

In S13, the CPU 14 performs an RSS site setting processing. In this RSS site setting processing, the site URL 102 of an RSS site the user wants to browse or look at is registered or added to the MFD 10. The RSS site setting processing may be performed, e.g., by the user inputting the site URL 102 using the touch panel 50 or the key pads 52 in a state in which an RSS site setting display is displayed on the touch panel 50.

Then, in S15, the CPU 14 judges whether the user has confirmed or determined the registration of the RSS site or not. Where the CPU 14 has judged that the user has not confirmed the registration by, e.g., pressing a "CANCEL" button (S15: NO), the RSS site setting processing is completed. On the other hand, where the CPU 14 has judged that the user has confirmed the registration by pressing an "OK" button (S15: YES), the processing goes to S17. In S17, the CPU 14 stores the inputted site URL 102 into the URL storage area 44.

On the other hand, where the CPU 14 has judged that the MFD 10 is not in the RSS site setting mode (S11: NO), the processing goes to S19. In S19, the CPU 14 judges whether an article updating time has reached or not. The article updating time is calculated so as to reach at intervals of predetermined times. The predetermined time is set in advance by the user, for example. Where the CPU 14 has judged that the article updating time has reached (S19: YES), the processing goes to S21. In S21, the CPU 14 performs the article updating processing. This article updating processing will be described in detail below. On the other hand, where the CPU 14 has judged that the article updating time has not reached (S19: NO), the processing goes to S29.

In S29, the CPU 14 performs the article display processing. The MFD 10 may be configured such that, in the article display processing, the content-title character strings 140 of the respective content informations 132 are displayed on the touch panel 50 so as to be scrolled one by one, and when the user has touched one of the content-title character strings 140, the description 144 corresponding to the touched content-title character string 140 is displayed, for example. Further, the MFD 10 may be configured such that, in the article display processing, a button for displaying the detailed information is displayed on the touch panel 50, and when the user has touched the button, a content based on which the description 144 is made is displayed.

Figure 3:
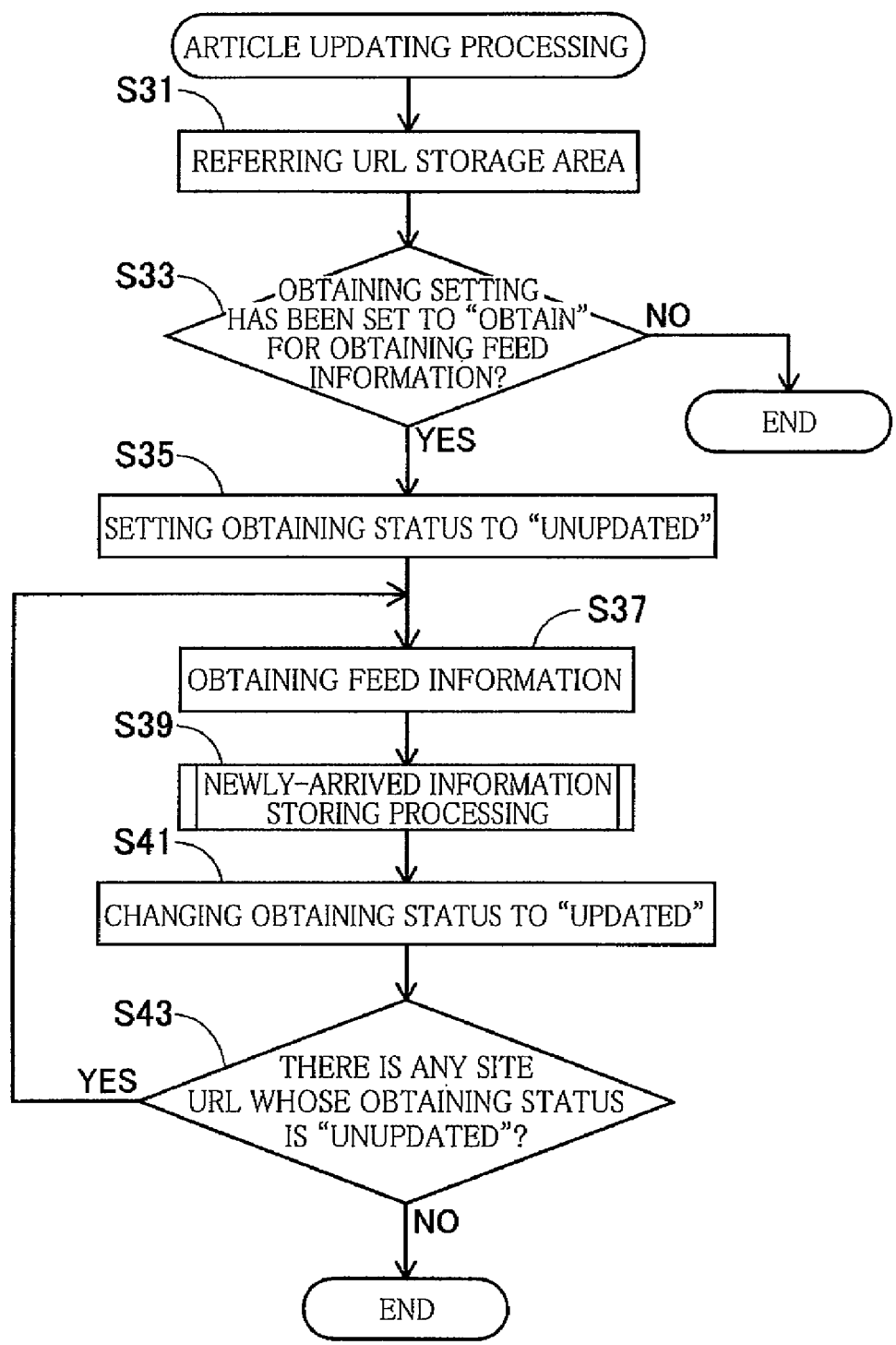
FIG. 3 is a flow-chart showing an article updating processing of the MFD.

There will be explained in detail the article updating processing performed in S21 in the MFD 10 with reference to FIG. 3. In S31, the CPU 14 refers the site URLs 102 stored in the URL storage area 44 (with reference to FIG. 8) in order.

Then, in S33, the CPU 14 judges whether the obtaining setting 103 of each site URL 102 has been set to "OBTAIN" or not. Where the CPU 14 has judged that the obtaining setting 103 has not been set to "OBTAIN" (S33: NO), the article updating processing is completed. Where the CPU 14 has judged that the obtaining setting 103 has been set to "OBTAIN" (S33: YES), the processing goes to S35. In S35, the CPU 14 sets, to "UNUPDATED", the obtaining status 104 of the site URL 102 whose obtaining setting 103 has been set to "OBTAIN" in the URL storage area 44.

Then, in S37, the CPU 14 accesses each of the content distribution servers 90, 91 on the basis of the site URL 102 and obtains the feed information(s).

Then, in S39, the CPU 14 performs the newly-arrived information storing processing. The newly-arrived information storing processing is a processing for extracting and storing the content information(s) 132 of newly-arrived information. The newly-arrived information storing processing will be described in detail below.

Then, in S41, the CPU 14 changes, to "UPDATED", the obtaining status 104 of each site URL 102 having obtained the feed information.

In S43, the CPU 14 judges whether there is any site URL 102 whose obtaining status 104 is "UNUPDATED" in the URL storage area 44 or not. Where the CPU 14 has judged that there is any site URL 102 whose obtaining status 104 is "UNUPDATED" (S43: YES), the processing returns to S37, and the CPU 14 obtains the feed information on the basis of the site URL 102 which has not been updated yet. On the other hand, where the CPU 14 has judged that there is no site URL 102 whose obtaining status 104 is "UNUPDATED" (S43: NO), the processing is completed.

Figure 4:
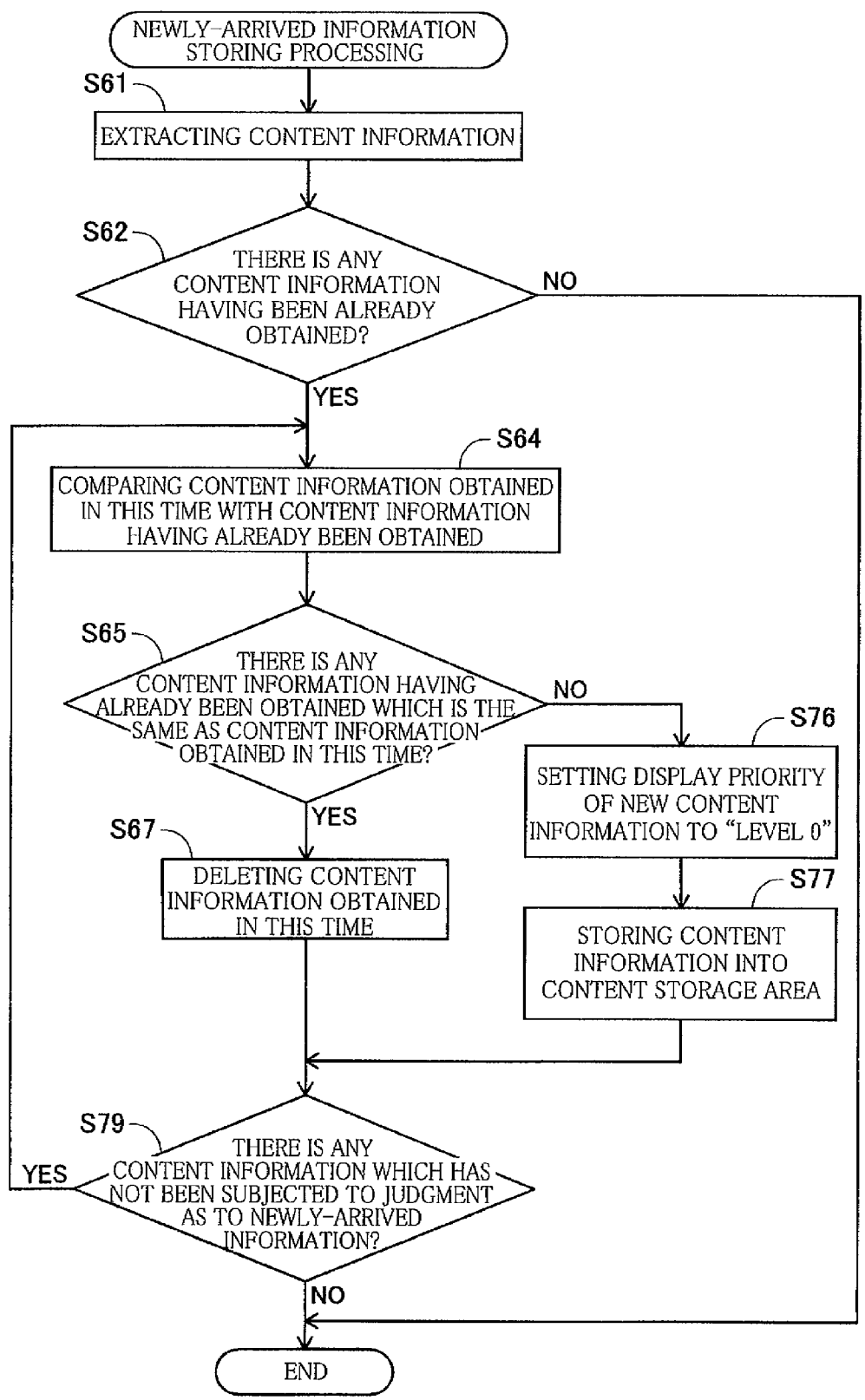
FIG. 4 is a flow-chart showing a newly-arrived information storing processing of the MFD as a first embodiment.

There will be next explained in detail the newly-arrived information storing processing performed in S39 in the MFD 10 with reference to FIG. 4. In S61, the CPU 14 performs or executes the feed-information analyzing program 22. Then, the CPU 14 analyzes files in XML format as the obtained feed information and extracts each content information 132.

In S62, the CPU 14 judges whether there is any content information 132 having been already obtained or not This judgment is performed by confirming presence or absence of the content information(s) 132 stored in the content storage area 37 (with reference to FIG. 9). Where the CPU 14 has judged that there is no content information 132 having been already obtained (S62: NO), the processing is completed. Where the CPU 14 has judged that there is any content information 132 having been already obtained (S62: YES), the processing goes to S64. In S64, the CPU 14 compares each content information 132 obtained in this time with the content information 132 having already been obtained.

Then, in S65, the CPU 14 judges whether the content information 132 the same as the content information 132 obtained in this time exists in the content information 132 having already been obtained. For example, where the content information 132 having the content-title character string 140 the same as that of the content information 132 obtained in this time exists in the content information 132 having already been obtained, the CPU 14 judges that the already-obtained content information 132 the same as the content information 132 obtained in this time exists. Further, the judgment may be performed by judging whether the content-updated date-and-time informations 142 coincide with each other or not, for example. Where the CPU 14 has judged that the content information 132 the same as the content information 132 obtained in this time already exist (S65: YES), the processing goes to S67 in which the CPU 14 deletes the content information 132 obtained in this time. Then, the processing goes to S79.

On the other hand, where the CPU 14 has judged that the content information 132 the same as the content information 132 obtained in this time does not exist (S65: NO), the CPU 14 judges that the content information 132 obtained in this time is the newly-arrived information, and the processing goes to S76. In S76, the CPU 14 sets the display priority 147 of the new content information 132 as the newly-arrived information, to "level 0" which is an initial display priority set in advance. The initial display priority is a value set in advance by the user, or the like. Further, the display priority 147 takes the highest value of the display priority in the case where the initial display priority has been set. In other words, the display priority of the initial display priority is higher than that of each content information having been displayed on the touch panel 50. Further, the CPU 14 sets, to "new", the attribute information 149 of the content information 132 obtained in this time.

Then, in S77, the CPU 14 stores the content information 132 as the newly-arrived information into the content storage area 37 (with reference to FIG. 9). Then, the processing goes to S79.

In S79, the CPU 14 judges whether or not there is any content information 132 which has not been subjected to the judgment as to whether the content information is the newly-arrived information or not, among the content information(s) 132 obtained in this time. Where the CPU 14 has judged that there is any content information 132 which has not been subjected to the judgment yet (S79: YES), the processing returns to S64, and the CPU 14 performs the newly-arrived information storing processing for the content information(s) 132 which has not been subjected to the judgment yet. On the other hand, where the CPU 14 has judged that there is no content information 132 which has not been subjected to the judgment (S79: NO), the processing is completed.

As a result, the CPU 14 can perform the newly-arrived information storing processing, i.e., S61-S79, in which the CPU 14 extracts the new content information(s) 132 each obtained as the newly-arrived information, then sets the initial display priority of the new content information(s) 132 to "level 0" and the attribute information 149 of the new content information(s) 132 to "new", and finally stores the new content information(s) into the content storage area 37.

Figure 5:
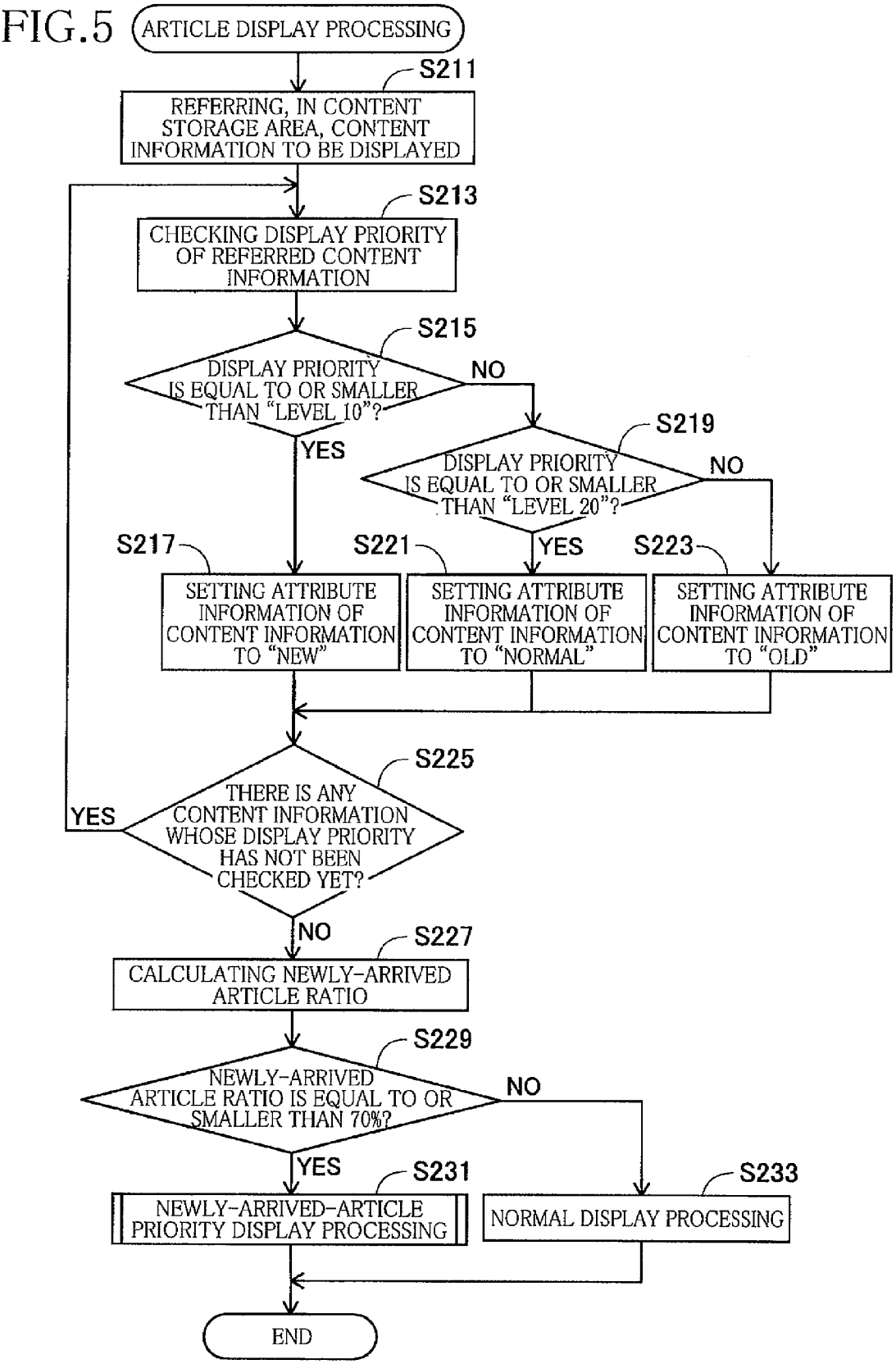
FIG. 5 is a flow-chart showing an article display processing of the MFD as the first embodiment.

There will be next explained in detail the article display processing performed in S29 in the MFD 10 with reference to FIG. 5. The article display processing is a processing for displaying on the touch panel 50 at least part of the content information 132 as information for selecting the content information 132. In an example in the present embodiment, there will be explained the case where the content-title character string 140 is used as the information for selecting the content information 132.

In S211, the CPU 14 refers, in the content storage area 37, the content information 132 to be displayed. Then, in S213, the CPU 14 checks the display priority 147 of the referred content information 132.

Then, in S215, the CPU 14 judges whether the checked display priority 147 is equal to or smaller than "level 10" or not. Where the CPU 14 has judged that the checked display priority 147 is equal to or smaller than "level 10" (S215: YES), the processing goes to S217 in which the CPU 14 sets the attribute information 149 of the referred content information 132 to "new". Then, the processing goes to S225. On the other hand, where the CPU 14 has judged that the checked display priority 147 is not equal to or smaller than "level 10" (S215: NO), the processing goes to S219.

In S219, the CPU 14 judges whether the referred display priority 147 is equal to or smaller than "level 20" or not. Where the CPU 14 has judged that the referred display priority 147 is equal to or smaller than "level 20" (S219: YES), the processing goes to S221 in which the CPU 14 sets the attribute information 149 of the referred content information 132 to "normal". Then, the processing goes to S225. On the other hand, where the CPU 14 has judged that the referred display priority 147 is not equal to or smaller than "level 20" (S219: NO), the processing goes to S223. In S223, the CPU 14 sets the attribute information 149 of the content information 132 to "old". Then, the processing goes to S225.

In S225, the CPU 14 judges whether there is any content information 132 whose display priority 147 has not been checked yet among the content information(s) 132 stored in the content storage area 37. Where the CPU 14 has judged that there is any content information 132 whose display priority 147 has not been checked yet (S225: YES), the processing returns to S213 in which the CPU 14 checks the display priority 147 of the content information(s) 132 whose display priority 147 has not been checked yet. On the other hand, the CPU 14 has judged that there is no content information 132 whose display priority 147 has not been checked yet (S225: NO), the processing goes to S227.

In S227, the CPU 14 calculates a newly-arrived article ratio. The newly-arrived article ratio is a ratio of the content information(s) (the newly-arrived article(s)) 132 obtained in the extraction of the content information(s) 132 in this time, to all the content information(s) 132 stored in the content storage area 37 (i.e., the newly-arrived article(s) and the content information(s) 132 obtained in and before a previous extraction).

Then, in S229, the CPU 14 judges whether the calculated newly-arrived article ratio is equal to or smaller than a predetermined ratio. A value of the predetermined ratio may be set in advance by the user or the like, for example. In an explanation in the present embodiment, the case where the predetermined ratio is 70% will be explained. Where the CPU 14 has judged that the newly-arrived article ratio is equal to or smaller than 70% (S229: YES), the processing goes to S231 in which the CPU 14 performs a newly-arrived-article priority display processing. The newly-arrived-article priority display processing is a processing in which the CPU 14 displays on the touch panel 50 the content-title character string 140 of each of all the content information(s) 132 stored in the content storage area 37, in a larger number of times in the case of the content information 132 whose display priority 147 is high than in the case of the content information 132 whose display priority 147 is low, during the scroll display in which the content-title character string 140 is displayed on the touch panel 50 so as to be scrolled. The newly-arrived-article priority display processing will be described in detail below.

On the other hand, where the CPU 14 has judged that the newly-arrived article ratio is not equal to or smaller than 70% (S229: NO), the processing goes to S233 in which the CPU 14 performs a normal display processing. The normal display processing is a processing in which the CPU 14 displays, on the touch panel 50, the content-title character string 140 of each of all the content information(s) 132 stored in the content storage area 37 at the same number of times, regardless of whether the display priority 147 is high or low.

Figure 6:
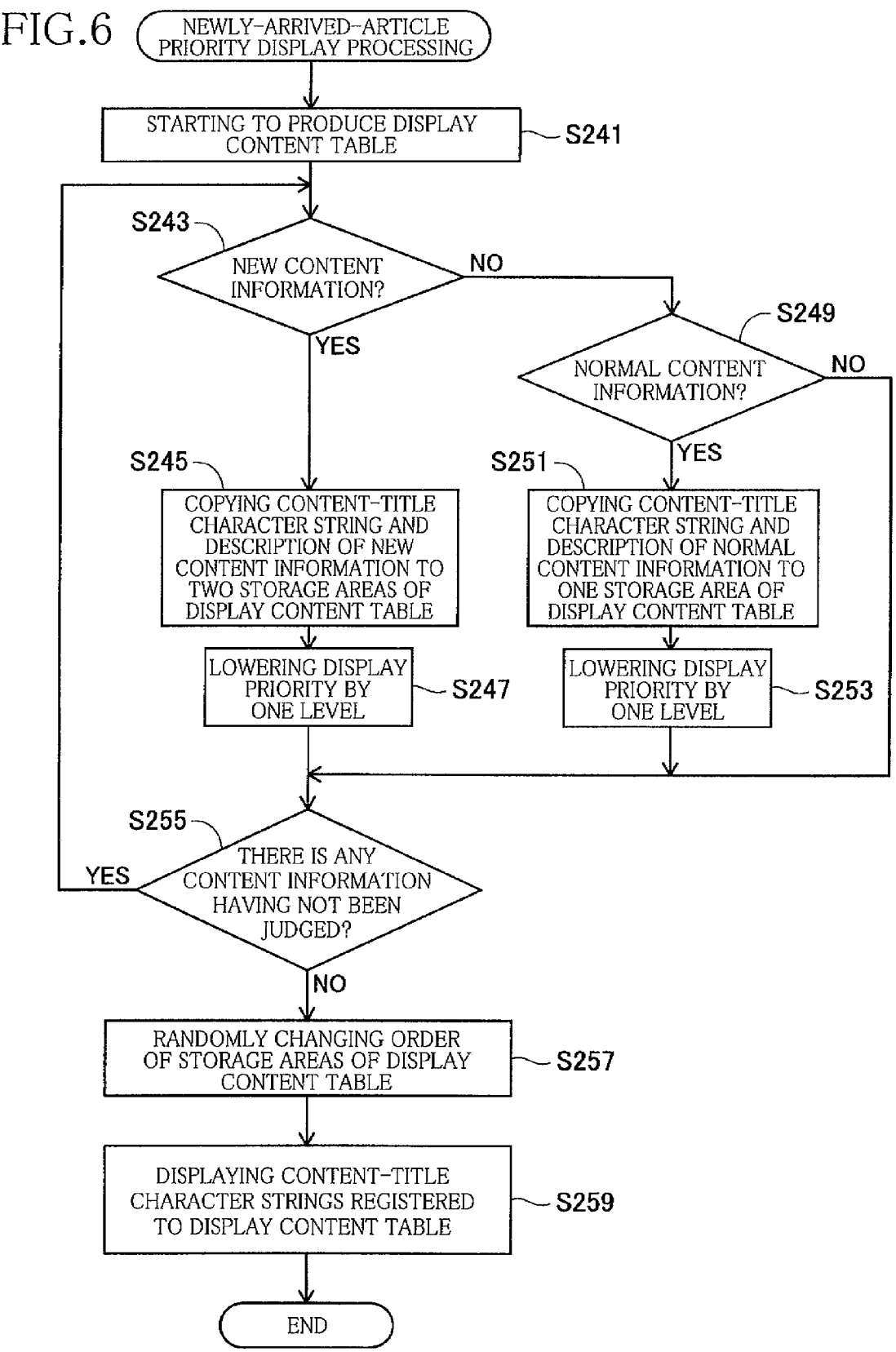
FIG. 6 is a flow-chart showing a newly-arrived-article priority display processing of the MFD as the first embodiment.

There will be explained the newly-arrived-article priority display processing with reference to FIG. 6. The newly-arrived-article priority display processing is a processing for displaying on the touch panel 50 the description 144 and/or the content relating to the content information 132 selected by the user. In S241, the CPU 14 starts to produce the display content table 36.

In S243-S255, the CPU 14 selects the content informations 132 stored in the content storage area 37 one by one and judges whether each of the selected content informations is registered or added to the display content table 36 (with reference to FIG. 10) or not. In S243, the CPU 14 judges whether the selected one of the content informations 132 is the new content information 132 or not. Specifically, the CPU 14 judges whether the content information 132 whose attribute information 149 is "new" is the new content information 132 or not. Where the CPU 14 has judged that the selected content information 132 is the new content information 132 (S243: YES), the processing goes to S245. In S245, the CPU 14 copies the content-title character string 140 and the description 144 of the new content information 132 to two of the storage areas 134 of the display content table 36. Then, the processing goes to S247 in which the CPU 14 lowers the display priority 147 of the selected content information 132 by one level (a first degree). Then, the processing goes to S255.

On the other hand, where the CPU 14 has judged that the selected content information 132 is not the new content information 132 (S243: NO), the processing goes to S249. In S249, the CPU 14 judges whether the selected content information 132 is normal content information 132 or not. Specifically, the CPU 14 judges whether the content information 132 whose attribute information 149 is "normal" is the normal content information 132 or not. Where the CPU 14 has judged that the selected content information 132 is not the normal content information 132 (S249: NO), the processing goes to S255. Where the CPU 14 has judged that the selected content information 132 is the normal content information 132 (S249: YES), the processing goes to S251. In S251, the CPU 14 copies the content-title character string 140 and the description 144 of the normal content information 132 to one of the storage areas 134 of the display content table 36. Then, the processing goes to S253 in which the CPU 14 lowers the display priority 147 of the selected content information 132 by one level. Then, the processing goes to S255.

In S255, the CPU 14 judges whether any content information 132 having not been subjected to the judgment as to the registration to the display content table 36 exists in the content storage area 37 or not. Where the CPU 14 has judged that there is any content information 132 having not been subjected to the judgment (S255: YES), the processing goes to S243 in which the CPU 14 performs the above judgment for the content information(s) 132 having not subjected to the judgment. On the other hand, where the CPU 14 has judged that there is no content information 132 having not been subjected to the judgment (S255: NO), the processing goes to S257.

In S257, the CPU 14 randomly changes the order of the storage areas 134 of the display content table 36. Then, in S259, the CPU 14 displays on the touch panel 50 the content-title character strings 140 registered to the display content table 36 so as to scroll the content-title character strings 140 in the order of the memory number.

As a result, the content informations 132 are registered or added to the display content table 36 such that a ratio of the storage area of the new content informations 132 to the normal content informations 132 becomes two to one. In a detailed-information display processing which will be described below, the CPU 14 displays on the touch panel 50 all the content informations 132 stored in the display content table 36. The CPU 14 displays on the touch panel 50 the content information 132 once per one storage area 134 in which the content information 132 is stored. For example, where the content information 132 is stored in two storage areas 134, the CPU 14 displays the content information 132 twice during displaying of all the content informations stored in the display content table 36. Thus, during the scroll display in which the content-title character strings 140 of all the content informations 132 which are stored in the display content table 36 and whose attribute informations 149 are "new" or "normal" are displayed so as to be scrolled, a probability of the display of the content-title character string 140 of each new content information 132 on the touch panel 50 is twice as large as that of the content-title character string 140 of each normal content information 132.

Figure 7:
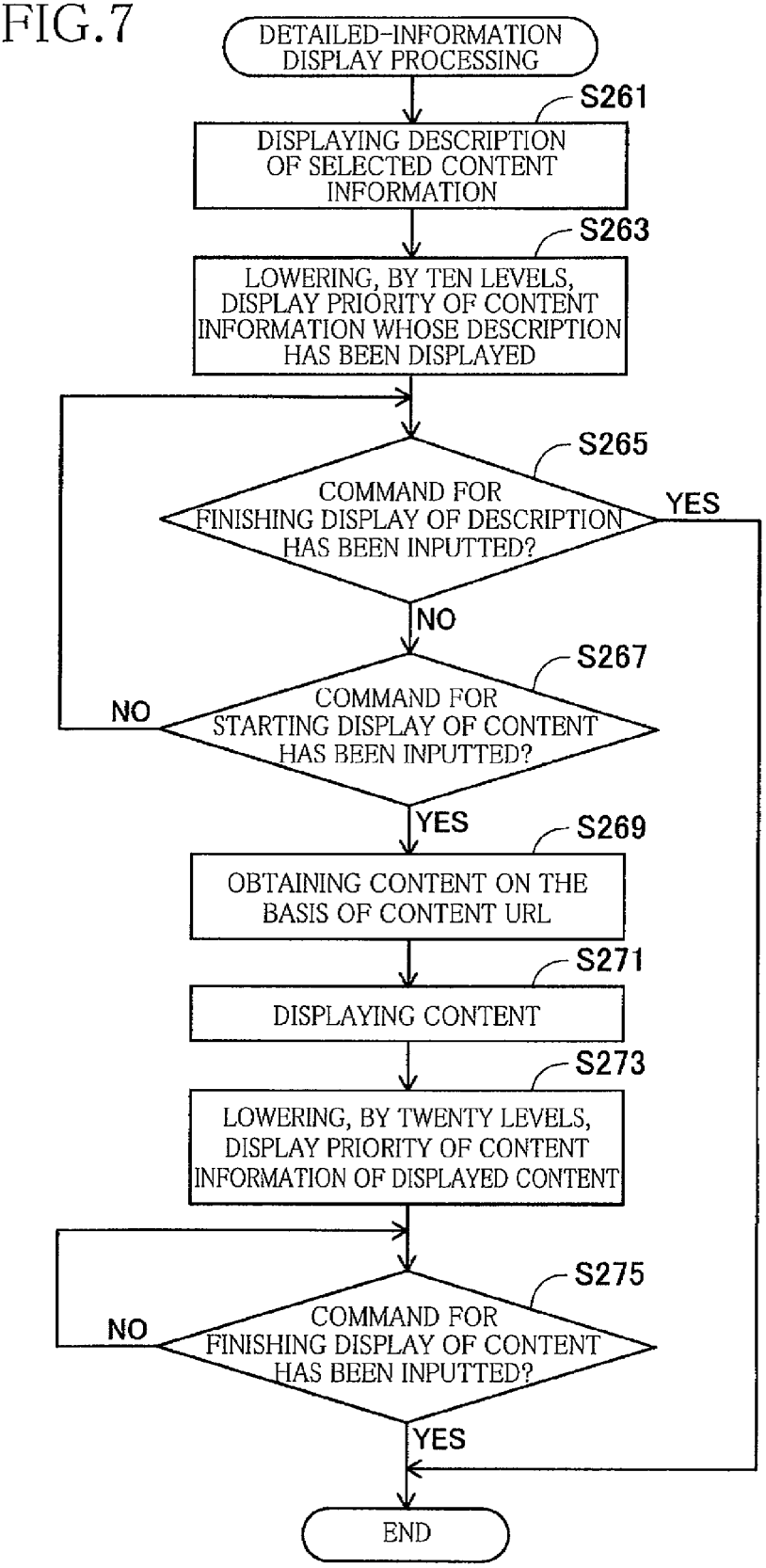
FIG. 7 is a flow-chart showing a detailed-information display processing of the MFD as the first embodiment.

There will be next explained the detailed-information display processing with reference to FIG. 7. The detailed-information display processing is a processing in which the user selects the content-title character string 140 scrolled and displayed on the touch panel 50, and the CPU 14 displays detailed information relating to the selected content-title character string 140 on the touch panel 50. The detailed-information display processing is an independent processing as an interrupt processing.

In S261, the CPU 14 displays the description 144 of the selected content information 132. Specifically, on the basis of a touch operation in which the user touches the content-title character string 140 scrolled and displayed on the touch panel 50, the CPU 14 selects the content information 132 including the content-title character string 140 subjected to the touch operation. Then, the CPU 14 displays the description 144 of the selected content information 132 on the touch panel 50.

As a result, where the user is interested in the content by viewing the content-title character string 140, the user can know a summary of the content by performing the touch operation for the content-title character string 140 to display the description 144.

Then, in S263, the CPU 14 lowers, by ten levels (a second degree), the display priority 147 of the content information 132 whose description 144 has been displayed.

Then, in S265, the CPU 14 judges whether a command for finishing the display of the description 144 has been inputted or not. For example, the MFD 10 may be configured such that a button representing that the display is finished is displayed on the touch panel 50, and the command for finishing the display is inputted by the user touching the button. Where the CPU 14 has judged that the command for finishing the display has been inputted (S265: YES), the processing is completed. On the other hand, where the CPU 14 has judged that the command for finishing the display has not been inputted (S265: NO), the processing goes to S267.

In S267, the CPU 14 judges whether a command for starting the display of the content has been inputted or not. For example, the MFD 10 may be configured such that a button representing that the detailed information is displayed on the touch panel 50, and the command for starting the display of the content is inputted by the user touching the button. Where the CPU 14 has judged that the command for starting the display has not been inputted (S267: NO), the processing returns to S265. Where the CPU 14 has judged that the command for starting the display has been inputted (S267: YES), the processing goes to S269.

In S269, the CPU 14 downloads the content(s) from the content distribution servers 90, 91 on the basis of the content URL 146. Then, in S271, the CPU 14 displays the downloaded content(s) on the touch panel 50. Then, in S273, the CPU 14 lowers, by twenty levels (a third degree), the display priority 147 of the content information 132 of each displayed content.

Then, in S275, the CPU 14 judges whether the command for finishing the display of the content has been inputted or not. For example, the MFD 10 may be configured such that a button representing that the display of the content is finished is displayed on the touch panel 50, and the command for finishing the display of the content is inputted by the user touching the button. Where the CPU 14 has judged that the command for finishing the display has not been inputted (S275: NO), the processing returns to S275, and the CPU 14 waits until the command for finishing the display is inputted. Where the CPU 14 has judged that the command for finishing the display has been inputted (S275: YES), the processing is completed.

As a result, where the user is interested in the content by reading the description 144, the user can display the content on the touch panel 50 by inputting the command for starting the display of the content.

It is noted that a display manner in which the description 144 and the content are displayed on the touch panel 50 is not limited to the scroll display but may be various manners. For example, where a display content is too large or too long to be displayed in a screen of the touch panel 50, the displayed content may be manually scrolled, or a displayed page may be changed or scrolled using a page-changing button.

As explained above, the MFD 10 as the present embodiment is configured such that at a time when the CPU 14 has obtained the new content information 132 as the newly-arrived information, the CPU 14 assigns the highest display priority 147 (i.e., level 0) to the content information 132.

Then, each time when the content-title character string 140 is automatically displayed so as to be scrolled, the display priority 147 of the content information 132 corresponding to the content-title character string 140 is lowered by one level. Further, in accordance that the user displays the description 144, the display priority 147 of the content information 132 corresponding to the description 144 is lowered by ten levels. Furthermore, in accordance that the user displays the content, the display priority 147 of the content information 132 corresponding to the content is lowered by twenty levels. Then, the content-title character string 140 of the content information 132 whose display priority 147 is higher is displayed on the touch panel 50 in the larger number of times.

In view of the above, the CPU 14 can be considered to include a content-information extracting section which is configured to obtain the feed information and extract the content information 132 from the obtained feed information, and which performs the processing of S61. Further, the CPU 14 can be considered to include a display-priority setting section which is configured to set the display priority for each content information 132 and which performs the processing of S76. Further, the CPU 14 can be considered to include a display-priority changing section which is configured to lower, on the basis of display of at least part of the content information 132 on the touch panel 50, the display priority of the displayed content information 132 by the first degree, and which performs the processings of S247 and S253. Further, the CPU 14 can be considered to include a display-number setting section which is configured to set the display number of times such that the display number of times of the content information 132 displayed on the touch panel 50 during displaying of the at least part of each of all content informations 132 on the touch panel 50 which are to be displayed on the touch panel 50 among the plurality of content informations 132 is larger in a situation in which the content information 132 has a high display priority 147 than in a situation in which the content information 132 has a low display priority 147, and which performs the processings of S247 and S253. Further, the CPU 14 can be considered to include a display controller which is configured to display the at least part of the content information 132 on the touch panel 50 on the basis of the display number of times of the content information 132 having been set by the display-number setting section, and which performs the processing of S29. Further, the CPU 14 can be considered to include a selection receiving section which is configured to receive an operation in which the at least part of the content information 132 to be displayed on the touch panel 50 is selected, and which performs the detailed-information display processing. Further, the CPU 14 can be considered to include a newly-arrived-information judging section that is configured to judge whether content information 132 different from content information 132 extracted before has been extracted or not when the feed information is newly obtained and the content information 132 is extracted by the content-information extracting section, and configured to set the display priority of content information 132 which has not been extracted before, to the initial display priority, and that performs the processings of S62 and S76. Further, the CPU 14 can be considered to include a content-information-storage-number setting section that is configured to store each content information 132 into the display content table 36 such that the storing number of times in which the content information 132 is stored into the display content table 36 is larger in a situation in which the content information 132 has a high display priority 147 than in a situation in which the content information has a low display priority 147, and that performs the processings of S245 and S251.

There will be explained effects of this MFD 10 below. In the MFD 10 as the present embodiment, the display priority 147 of the content information 132 whose content-title character string 140 has been displayed so as to be scrolled is lowered by one level. Then, the content-title character string 140 of the content information 132 whose display priority 147 is higher is displayed on the touch panel 50 in the larger number of times. That is, in accordance that the display number of times of the content-title character string 140 of the content information 132 which has been displayed on the touch panel 50 from turning on the main power of the MFP 1 becomes larger, the display number of times of the content-title character string 140 which is to be displayed on the touch panel 50 by the time the main power is turned off becomes smaller. As a result, the content-title character string 140 of the content information 132 whose number of the displays is small is displayed so as to be buried in the content-title character string(s) 140 of the content information(s) 132 whose number of the displays is large, thereby preventing an occurrence of the case where the user does not notice the content-title character string 140 of each content information 132 whose number of the displays is small. Further, the case where the same content-title character string 140 is repeatedly displayed can be prevented from occurring by making smaller the display number of times of the content-title character string 140 of each content information 132 whose number of the displays is large. Thus, the content-title character string 140 of each content information 132 whose number of the displays is small can be displayed in a manner in which the user can easily notice the content-title character string 140.

Further, in the MFD 10 as the present embodiment, the CPU 14 lowers the display priority 147 of each content information 132 whose description 144 has been displayed by the user. As a result, it is possible to prevent an occurrence of the case where the content-title character string 140 of each content information 132 whose description 144 has been already read is repeatedly displayed. Thus, it is possible to display the content information 132 whose description 144 has not been read yet in a manner in which the user can easily notice the content information 132.

Further, in the MFD 10 as the present embodiment, the CPU 14 lowers the display priority 147 of the content information 132 whose content has been displayed by the user. As a result, it is possible to prevent an occurrence of the case where the content-title character string 140 of each content information 132 whose content has been already read is repeatedly displayed. Thus, it is possible to display the content information 132 whose content has not read yet in a manner in which the user can easily notice the content information 132.

Further, in the MFD 10 as the present embodiment, each of a degree of the lowering of the display priority 147 by the display of the description 144 (i.e., by ten levels) and a degree of the lowering of the display priority 147 by the display of the content (i.e., by twenty levels) is larger than a degree of the lowering of the display priority 147 by the display of the content-title character string 140 (i.e., by one level). Thus, the content information 132 whose description 144 or content has not been displayed yet (i.e., information having a high possibility of being selected by the user) is displayed in the larger number of times than the content information 132 whose description 144 or content has been already displayed (i.e., information having a low possibility of being selected by the user), thereby improving a usability of the MFD 10.

Further, in the MFD 10 as the present embodiment, the degree of the lowering of the display priority 147 by the display of the content (i.e., by twenty levels) is larger than the degree of the lowering of the display priority 147 by the display of the description 144 (i.e., by ten levels). There is a high possibility that each content information 132 whose description 144 has been displayed is selected by the user again in order to display the content of the content information 132. On the other hand, there is a low possibility that each content information 132 whose content has been displayed is selected again because there is no information having more details than the content. Further, the content information 132 whose description 144 has been displayed is displayed in the larger number of times than the content information 132 whose content has been displayed, thereby improving the usability of the MFD 10.

There will be next explained a second embodiment of the present invention with reference to FIGS. 11-14. In the above-described first embodiment, the display number of times on the touch panel 50 is changed on the basis of the display priority 147 set for each content information 132, but, in this second embodiment, a display number related value 160 is set for each content information 132, instead of the display priority 147, as a value relating to the display number of times of the content-title character string 140, etc., of the content information 132 on the touch panel 50, and then the content-title character string 140, etc., of the content information 132 are displayed on the touch panel 50 on the basis of this display number related value 160. There will be hereinafter explained this second embodiment in detail, but the same reference numerals as used in the first embodiment are used in this second embodiment to identify the corresponding components, and an explanation of which is dispensed with.

Figure 11:
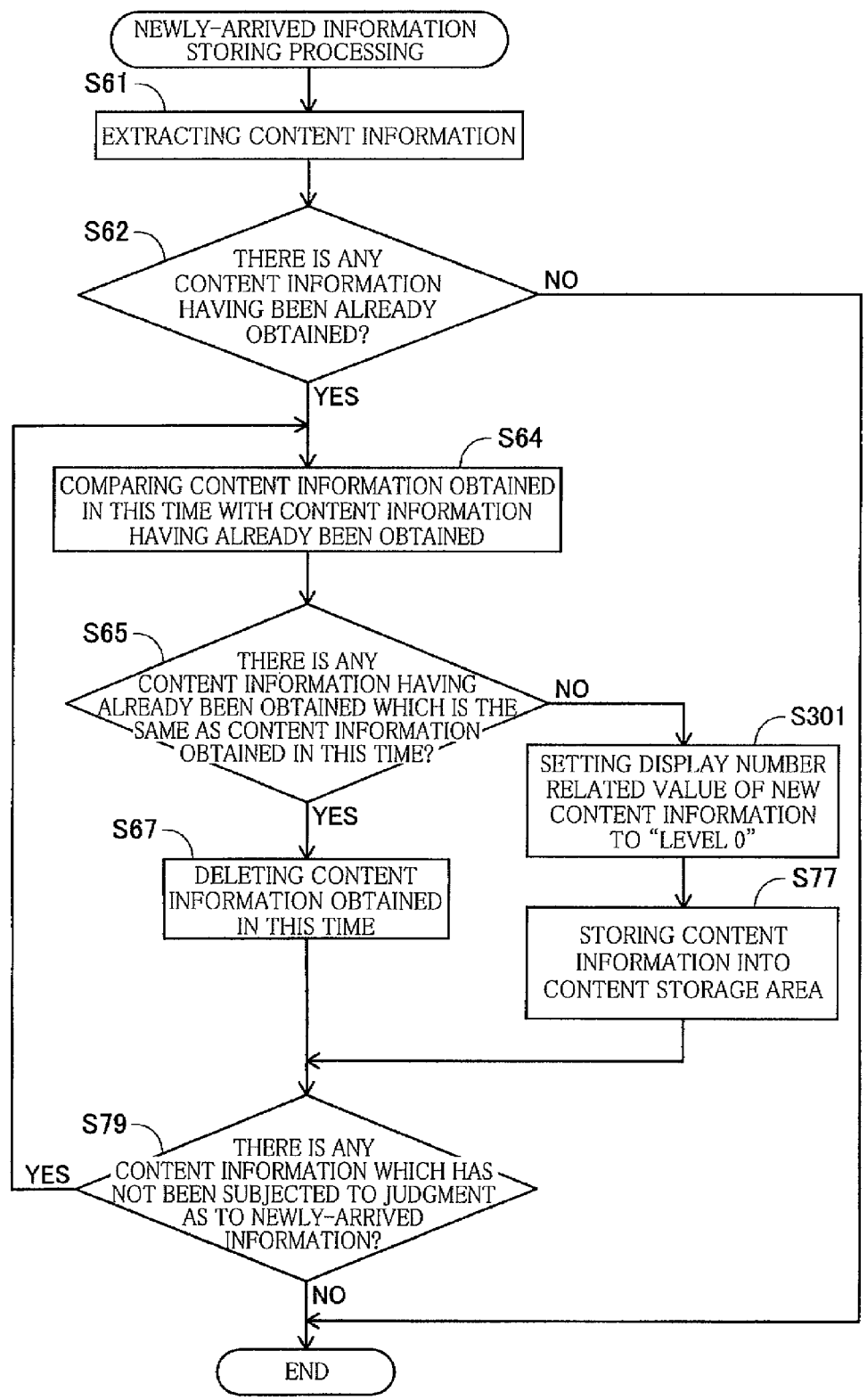
FIG. 11 is a flow-chart showing a newly-arrived information storing processing of the MFD as a second embodiment.

FIG. 11 shows a flow-chart of a newly-arrived information storing processing in the second embodiment and corresponds to FIG. 4 showing the newly-arrived information storing processing in the first embodiment. The MFD system 2 in the second embodiment has the configuration shown in FIG. 1 and performs the main loop processing shown in FIG. 2 and the article updating processing shown in FIG. 3. In the newly-arrived information storing processing shown in FIG. 11, the CPU 14 judges in S64 whether the content information 132 having already been obtained which is the same as the content information 132 obtained in this time exists in the content storage area 37 or not. Where the CPU 14 has judged that no content information 132 having already been obtained which is the same as the content information 132 obtained in this time exists in the content storage area 37, the processing goes to S301 in which the CPU 14 sets the display number related value 160 of the new content information 132 obtained in this time, to "level 0" (an initial display number related value). It is noted that the display number related value 160 is a value determined in accordance with the display number of times of the content-title character string 140, etc., of the content information 132 on the touch panel 50. For example, the display number related value 160 of the content information 132 having the content-title character string 140 whose display number of times is large is larger than that of the content information 132 having the content-title character string 140 whose display number of times is small. Further, as will be described below, the display number related value 160 of the content information 132 whose description 144 has been displayed on the touch panel 50 once is larger than that of the content information 132 whose content-title character string 140 has been displayed on the touch panel 50 once, for example. As thus described, the display number related value 160 is a value increased in accordance that the number of display of at least part of the content information 132 on the touch panel 50 is increased, but where informations which are different from each other in type are displayed on the touch panel 50, e.g., where the content-title character string 140 and the description 144 are displayed on the touch panel 50, increase degrees of the respective display number related values 160 of the content-title character string 140 and the description 144 are made different from each other. It is noted that, in the present embodiment, where the types of the informations displayed on the touch panel 50 are different from each other, the increase degrees of the respective display number related values 160 are different from each other, but the increase degrees of the respective display number related values 160 may be the same as each other even where the types of the informations displayed on the touch panel 50 are different from each other.

Figure 12:
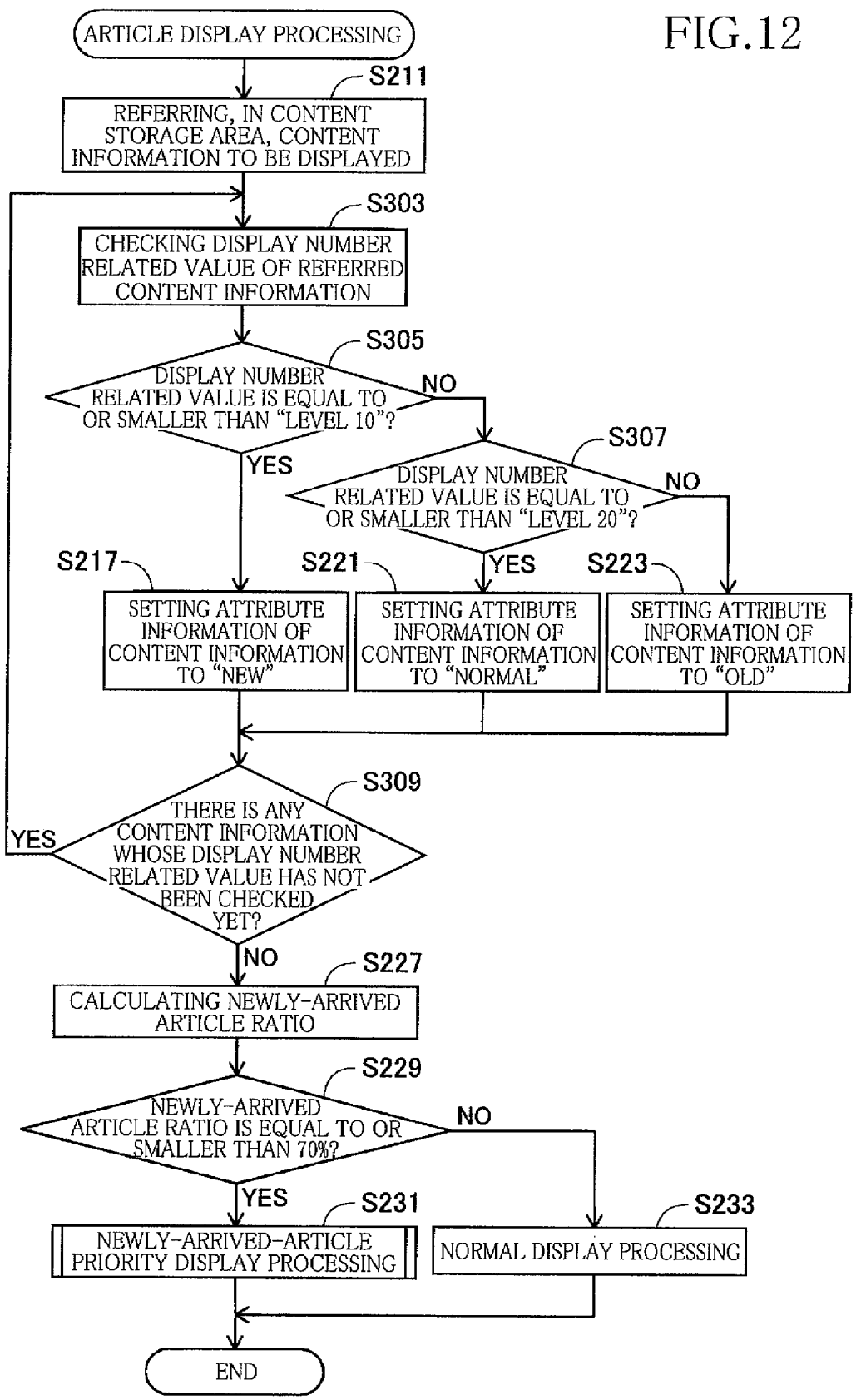
FIG. 12 is a flow-chart showing an article display processing of the MFD as the second embodiment.

There will be next explained an article display processing in the second embodiment with reference to FIG. 12. FIG. 12 corresponds to FIG. 5 showing the article display processing in the first embodiment. In S211, the CPU 14 refers, in the content storage area 37, the content information 132 to be displayed. Then, in S303, the CPU 14 checks the display number related value 160 of the referred content information 132. Then, in S305, the CPU 14 judges whether the checked display number related value 160 is equal to or smaller than "level 10" or not. Where the CPU 14 has judged that the checked display number related value 160 is equal to or smaller than "level 10" (S305: YES), the processing goes to S217 in which the CPU 14 sets the attribute information 149 of the referred content information 132 to "new". On the other hand, where the CPU 14 has judged that the checked display number related value 160 is not equal to or smaller than "level 10" (S305: NO), the processing goes to S307. In S307, the CPU 14 judges whether the referred display number related value 160 is equal to or smaller than "level 20" or not. Where the CPU 14 has judged that the referred display number related value 160 is equal to or smaller than "level 20" (S307: YES), the processing goes to S221 in which the CPU 14 sets the attribute information 149 of the referred content information 132 to "normal". On the other hand, where the CPU 14 has judged that the referred display number related value 160 is not equal to or smaller than "level 20" (S307: NO), the processing goes to S223. In 5223, the CPU 14 sets the attribute information 149 of the content information 132 to "old".

Figure 13:
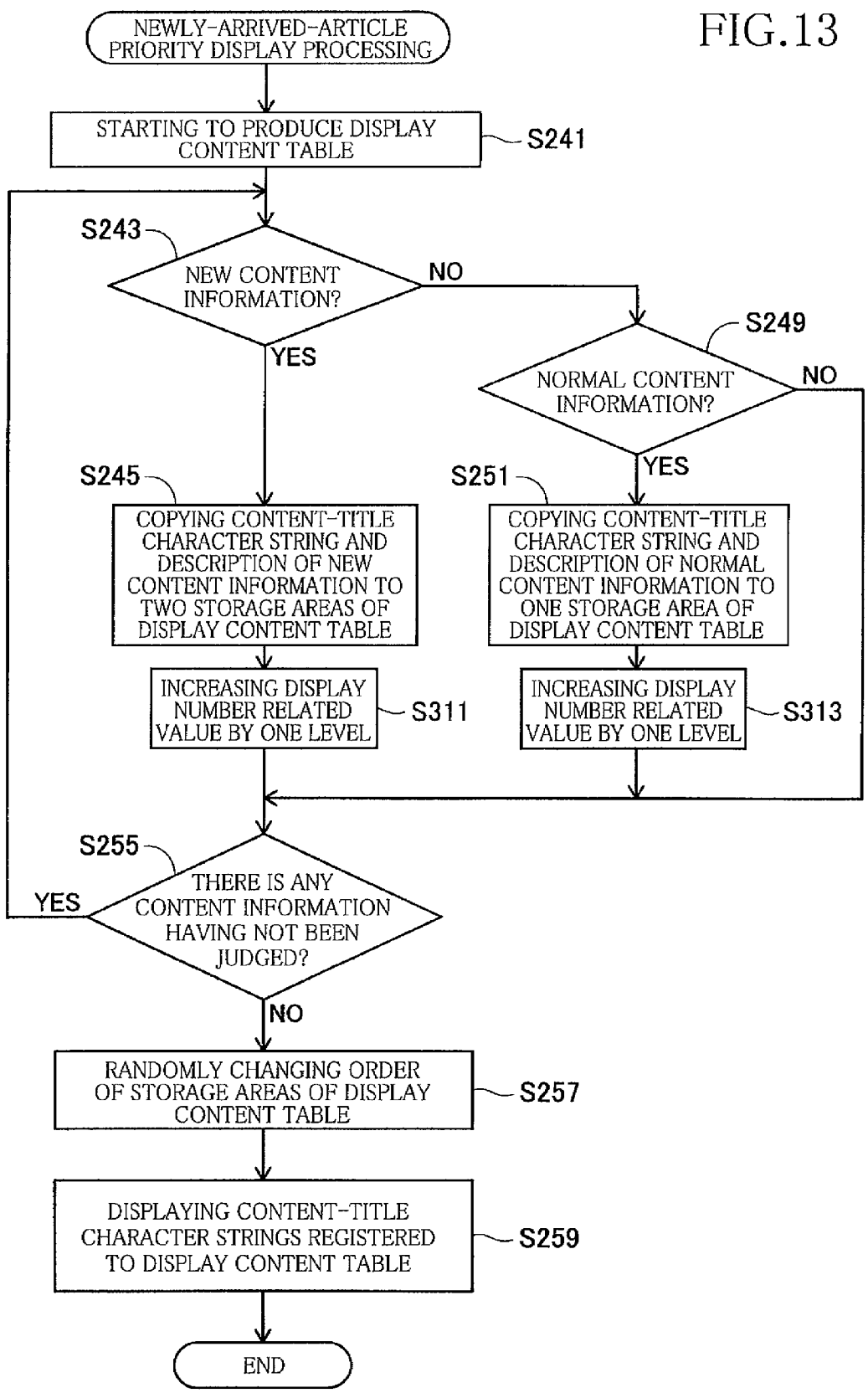
FIG. 13 is a flow-chart showing a newly-arrived-article priority display processing of the MFD as the second embodiment.

There will be next explained a newly-arrived-article priority display processing in the second embodiment with reference to FIG. 13. FIG. 13 corresponds to FIG. 6 showing the newly-arrived-article priority display processing in the first embodiment. In S243, the CPU 14 judges, when producing the display content table 36, whether the attribute information 149 of the content information 132 stored in the content storage area 37 is "new" or not. Where the CPU 14 has judged that the content information 132 is the new content information 132 (S243: YES), the processing goes to S245. In S245, the CPU 14 copies the content-title character string 140 and the description 144 of the new content information 132 to two of the storage areas 134 of the display content table 36. Then, the processing goes to S311 in which the CPU 14 increases the display number related value 160 by one level (a first degree). Further, where the CPU 14 has judged in S249 that the attribute information 149 of the content information 132 is "normal" (S249: YES), the processing goes to S251. In S251, the CPU 14 copies the content-title character string 140 and the description 144 of the normal content information 132 to one of the storage areas 134 of the display content table 36.

Then, the processing goes to S313 in which the CPU 14 increases the display number related value 160 by one level.

There will be next explained a detailed-information display processing in the second embodiment with reference to FIG. 14. FIG. 14 corresponds to FIG. 7 showing the detailed-information display processing in the first embodiment. In S261, the CPU 14 displays the description 144 of the content information 132 selected by the user on the touch panel 50. Then, in S315, the CPU 14 increases, by ten levels (a second degree), the display number related value 160 of the content information 132 whose description 144 has been displayed. Then, where the CPU 14 has judged in S267 that the command for starting the display of the content(s) has been inputted by the user (S267: YES), the processing goes to S269 in which the CPU 14 obtains the content(s) on the basis of the content URL 146. Then, in S271, the CPU 14 displays the obtained content(s) on the touch panel 50. Then, in S317, the CPU 14 increases, by twenty levels (a third degree), the display number related value 160 of the content information 132 including each displayed content.

As described above, in the second embodiment, where the content-title character string 140, the description 144, and the content of the content information 132 have been displayed on the touch panel 50, the display number related value 160 is increased. The display number related value 160 is a value which is referred when the content-title character string 140 is displayed on the touch panel 50. The content-title character string 140 of the content information 132 whose display number related value 160 is small is displayed on the touch panel 50 in a larger number of times than the content-title character string 140 of the content information 132 whose display number related value 160 is large. Thus, the content information 132 whose display number related value 160 is small, i.e., the content information 132 whose display number of times on the touch panel 50 is small can be displayed in a relatively large number of times, thereby displaying the content-title character string 140 of the content information 132 whose display number of times is small, in the manner in which the user can easily notice the content-title character string 140.

In view of the above, the CPU 14 can be considered to include a display number related value setting section which is configured to set the display number related value 160 for each content information 132 and which performs the processing of S301. Further, the CPU 14 can be considered to include a display number related value changing section which is configured to increase by the first degree, on the basis of the display of the at least part of the content information on the touch panel 50, the display number related value 160 of the content information 132 to be displayed, and which performs the processings of S311 and S313. Further, the CPU 14 can be considered to include a display-number setting section that is configured to set the display number of times such that the display number of times of content information 132 displayed on the touch panel 50 during displaying of the at least part of each of all content informations 132 on the touch panel 50 which are to be displayed on the touch panel 50 among the plurality of content informations 132 is larger in a situation in which the content information 132 has a small display number related value 160 than in a situation in which the content information 132 has a large display number related value 160, and that performs the processings of S245 and S251. Further, the CPU 14 can be considered to include a newly-arrived-information judging section that is configured to judge whether content information 132 different from content information 132 extracted before has been extracted or not when the feed information is newly obtained and the content information 132 is extracted by the content-information extracting section, and configured to set a display number related value 160 of content information 132 which has not been extracted before, to the initial display number related value whose display number related value 160 is smaller than that of the content information 132 having been displayed on the touch panel 50, and that performs the processing of S301. Further, the CPU 14 can be considered to include a content-information-storage-number setting section that is configured to store each content information 132 into the display content table 36 such that the storing number of times in which the content information 132 is stored into the display content table 36 is larger in a situation in which the content information 132 has a small display number related value 160 than in a situation in which the content information 132 has a large display number related value 160, and that performs the processings of S245 and S251.

While the embodiments of the present invention has been described above, it is to be understood that the invention is not limited to the details of the illustrated embodiments, but may be embodied with various changes and modifications, which may occur to those skilled in the art, without departing from the spirit and scope of the invention.

In the above-described embodiments, there has been explained the case where the content-title character string 140 is used as the information for the selection of the content information 132, but the present invention is not limited to this case. That is, the information for the selection of the content information 132 needs to be at least part of the content information 132. For example, the description 144 and/or the content-updated date-and-time information 142 may be used as the information for the selection of the content information 132.

Further, in the above-described embodiments, there has been explained the case where the probability of the display of the content-title character string 140 of each new content information 132 on the touch panel 50 is twice as large as that of the content-title character string 140 of each normal content information 132 on the touch panel 50, but the present invention is not limited to this case. That is, the probability can be changed as desired by a ratio of the number of copying of information relating to the content information 132 to the display content table 36. For example, where information relating to the new content information 132 is copied to the display content table 36 in the number three times as many as that of information relating to the normal content information 132, the probability of the display of the information relating to each new content information 132 can be made three times as large as that of the information relating to each normal content information 132.

Further, in the first embodiment, the attribute information 149 of the content information 132 whose display priority 147 is equal to or lower than "level 10" is set to "new", the attribute information 149 of the content information 132 whose display priority 147 is higher than "level 10" and equal to or lower than "level 20" is set to "normal", and the attribute information 149 of the content information 132 whose display priority 147 is higher than "level 20" is set to "old", but the present invention is not limited to this configuration. It is to be understood that a correlation between the display priority 147 and the attribute information 149 can be appropriately set by the user or the like.

The technological components described in the present specification or the drawings exhibit technological utility individually or in various combinations, and are not limited to the combinations disclosed in the claims at the time of application. Furthermore, the technology illustrated in the present specification or the drawings may simultaneously achieve a plurality of objects, and has technological utility by achieving one of these objects.

What is claimed is:

1. A communication apparatus comprising:
    a content-information extracting section executed by a processor and configured to obtain feed information including a plurality of content informations each of which at least includes a title of a content, positional information of the content, and text information representing an outline of the content, and configured to extract the content informations from the obtained feed information;
    a content-information memory configured to store at least some of the content informations of the feed information extracted by the content-information extracting section;
    a newly-arrived-information judging section executed by the processor and configured to judge whether content information different from previously-extracted content information has been extracted, when the feed information is newly obtained and the content informations are extracted by the content-information extracting section;
    a display-priority setting section executed by the processor and configured to set a display priority of the newly obtained content informations to an initial display priority whose display priority is higher than that of the content information that has been previously displayed on a display, when the newly-arrived-information judging section judges that the content information different from the previously-extracted content information has been extracted;
    a display-priority changing section configured to decrease the display priority of the content information by a first degree, when at least a portion of the content information is displayed on the display;
    a list creating section executed by the processor and configured to create a list defining an order of the display of the content informations stored in the content-information memory, the list containing display numbers that represent the order of the display of the content informations, the display numbers each being assigned to a corresponding one of the content informations; and
    a display controller executed by the processor and configured to display the content informations stored in the content-information memory, on the display in the order defined in the list created by the list creating section,
    wherein the list creating section is configured to create the list such that each content information having a higher display priority is assigned to more of the display numbers of the list than each content information having a lower display priority.

2. The communication apparatus according to claim 1, further comprising a selection receiving section configured to receive an operation in which one of the content informations to be displayed on the display is selected,
    wherein the display-priority changing section decreases the display priority of the content information by the first degree, when the title of the content information is displayed on the display,
    wherein the display controller is configured to display, on the display, the text information included in the content information selected in the selection receiving section, and
    wherein the display-priority changing section decreases the display priority of the content information by a second degree that is greater than the first degree, when the text information of the content information is displayed on the display.

3. The communication apparatus according to claim 1,
wherein the newly-arrived-information judging section is configured to perform the judgment by comparing the content informations stored in the content-information memory and the content informations extracted by the content-information extracting section.

4. The communication apparatus according to claim 2,
wherein the display controller is configured to obtain information for displaying the content on the basis of the content positional information included in the content information selected in the selection receiving section, and configured to display the content on the display on the basis of the obtained information, and
wherein the display-priority changing section decreases the display priority of the content information by a third degree that is greater than each of the first degree and the second degree, when the content of the content information is displayed.

5. A communication apparatus comprising:
a content-information extracting section executed by a processor and configured to obtain feed information including a plurality of content informations each of which at least includes a title of a content, positional information of the content, and text information representing an outline of the content, and configured to extract the content informations from the obtained feed information;
a content-information memory configured to store at least some of the content informations of the feed information extracted by the content-information extracting section;
a newly-arrived-information judging section executed by the processor and configured to judge whether content information different from previously-extracted content information has been extracted when the feed information is newly obtained and the content informations are extracted by the content information extracting section;
a display number related value setting section executed by the processor and configured to set a display number related value which is a value related to the display number of times of at least part of the content information on the display and which is larger in a situation in which the display number of times of the at least part of the content information is large than in a situation in which the display number of times of the at least part of the content information is small;
a display number related value changing section configured to increase the display number related value of the displayed content information by a first degree, when at least part of the content information is displayed on the display;
a list creating section executed by the processor and configured to create a list defining an order of the display of the content informations stored in the content-information storage portion, the list containing display numbers that represent the order of the display of the content informations, the display numbers each being assigned to a corresponding one of the content informations; and
a display controller executed by the processor and configured to display the content informations stored in the content-information memory, on the display in the order defined in the list created by the list creating section,
wherein the list creating section is configured to create the list such that each content information having a large display number related value is assigned to more of the display numbers of the list than each content information having a small display number related value.

6. The communication apparatus according to claim 5, further comprising a selection receiving section configured to receive an operation in which one of the content informations to be displayed on the display is selected,
wherein the display-priority changing section decreases the display priority of the content information by the first degree, when the title of the content information is displayed on the display,
wherein the display controller is configured to display, on the display, the text information included in the content information selected in the selection receiving section, and
wherein the display number related value changing section increases the display number related value of the content information by a second degree that is greater than the first degree, when the text information of the content information is displayed on the display.

7. The communication apparatus according to claim 5,
wherein the newly-arrived-information judging section is configured to perform the judgment by comparing the content informations stored in the content-information memory and the content informations extracted by the content-information extracting section.

8. The communication apparatus according to claim 6,
wherein the display controller is configured to obtain information for displaying the content on the basis of the content positional information included in the content information selected in the selection receiving section, and configured to display the content on the display on the basis of the obtained information, and
wherein the display number related value changing section increases the display number related value of the content information by a third degree that is greater than the second degree, when the content of the content information is displayed.

9. A non-transitory storage medium storing a program for displaying, on a display, at least part of content information at least including a title of a content, positional information of the content, and text information representing an outline of the content, the program comprising:
obtaining feed information including a plurality of the content informations
extracting the content informations from the obtained feed information;
storing at least some of the extracted content informations into a content-information memory;
judging whether content information different from previously-extracted content information has been extracted when the feed information is newly obtained and the content informations are extracted;
when it is judged that the content information different from the previously-extracted content information has been extracted, setting a display priority of the newly obtained content informations to an initial display priority whose display priority is higher than that of the content information having been previously displayed on the display;
when at least part of the content information is displayed on the display, decreasing the display priority of the displayed content information by a first degree;
creating a list defining an order of the display of the stored content informations and containing display numbers that represent the order of the display of the content informations, such that each content information having a higher display priority is assigned to more of the display numbers of the list than each content information having a lower display priority; and displaying the content informations stored in the content-information memory, on the display in the order defined in the list created by the list creating section.

10. The communication apparatus according to claim 1, wherein, when a ratio of the content informations each having a higher display priority to all the content informations of the feed information obtained by the content-information extracting section is equal to or less than a predetermined ratio, the list creating section creates the list such that each content information having a higher display priority is assigned to more of the list containing display numbers than each content information having a lower display priority.

* * * * *